United States Patent
Kaidu et al.

(10) Patent No.: US 10,651,769 B2
(45) Date of Patent: May 12, 2020

(54) MOTOR DRIVE CONTROL DEVICE AND MOTOR DRIVE CONTROL METHOD

(71) Applicant: Minebea Mitsumi Inc., Nagano (JP)

(72) Inventors: Hiroyuki Kaidu, Iwata (JP); Masato Aoki, Iwata (JP); Youhei Serizawa, Kakegawa (JP); Zhou Xiao, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/988,046

(22) Filed: May 24, 2018

(65) Prior Publication Data

US 2018/0351488 A1 Dec. 6, 2018

(30) Foreign Application Priority Data

May 31, 2017 (JP) .................. 2017-108820

(51) Int. Cl.
*H02P 6/08* (2016.01)
*H02P 6/28* (2016.01)
(Continued)

(52) U.S. Cl.
CPC ............... *H02P 6/28* (2016.02); *H02P 6/06* (2013.01); *H02P 6/08* (2013.01); *H02P 6/15* (2016.02); *H02P 6/14* (2013.01)

(58) Field of Classification Search
CPC ...... H02P 6/28; H02P 6/15; H02P 6/06; H02P 6/08; H02P 6/14
(Continued)

(56) References Cited

U.S. PATENT DOCUMENTS

2004/0000884 A1* 1/2004 Inao .................. H02P 6/14
 318/400.28
2007/0159124 A1 7/2007 Wasson et al.
(Continued)

FOREIGN PATENT DOCUMENTS

JP H09-009668 A 1/1997
JP 2005-160149 A 6/2005
(Continued)

OTHER PUBLICATIONS

Japanese Office Action dated Oct. 29, 2019 in the corresponding Japanese Application No. 2017-108820 and English translation.
(Continued)

*Primary Examiner* — Bickey Dhakal
*Assistant Examiner* — Zemenay T Truneh
(74) *Attorney, Agent, or Firm* — Pearne & Gordon LLP

(57) ABSTRACT

A motor drive control device includes: a control circuit unit for outputting a drive control signal for performing advance-angle control of a motor to drive the motor; a motor driving unit for outputting a drive signal to the motor with a phase based on the drive control signal output from the control circuit unit to drive the motor; and a current detecting circuit for detecting a voltage value corresponding to a drive current of the motor, wherein the control circuit unit detects a cross-timing between the voltage value detected by the current detecting circuit and each of two or more reference voltage values, and performs the advance-angle control based on a detection result of the cross-timing to adjust a phase of the drive current.

7 Claims, 12 Drawing Sheets

(51) Int. Cl.
   *H02P 6/06*    (2006.01)
   *H02P 6/15*    (2016.01)
   *H02P 6/14*    (2016.01)

(58) Field of Classification Search
   USPC .......................................... 318/558, 400.28
   See application file for complete search history.

(56) References Cited

U.S. PATENT DOCUMENTS

| | | | | |
|---|---|---|---|---|
| 2013/0069564 A1* | 3/2013 | Kaidu | ..................... | H02P 27/08 |
| | | | | 318/139 |
| 2015/0061555 A1* | 3/2015 | Hamasaki | ............. | B62D 5/046 |
| | | | | 318/400.06 |
| 2016/0118916 A1* | 4/2016 | Gohara | .................. | H02P 6/085 |
| | | | | 318/400.13 |

FOREIGN PATENT DOCUMENTS

| | | |
|---|---|---|
| JP | 2005-312217 A | 11/2005 |
| JP | 2006-020489 A | 1/2006 |
| JP | 2007-089322 A | 4/2007 |
| JP | 2016-019452 A | 2/2016 |

OTHER PUBLICATIONS

Japanese Office Action dated Mar. 2, 2020 for the corresponding Japanese Application No. 2017-108820 and English translation.

\* cited by examiner

MOTOR DRIVE CONTROL DEVICE AND MOTOR DRIVE CONTROL METHOD

CROSS REFERENCE TO RELATED APPLICATIONS

This application claims the benefit of Japanese Patent Application No. 2017-108820 filed May 31, 2017, which is hereby incorporated by reference in its entirety.

BACKGROUND

Technical Field

The present disclosure relates to a motor drive control device and a motor drive control method, and particularly relates to a motor drive control device and a motor drive control method for performing advance-angle control of a motor.

Background

A control method for inputting a command signal from the outside and controlling the rotational speed of a motor so that the rotational speed of the motor is matched with the speed based on the input command signal is known as a control method for controlling the rotational speed of a motor (for example, a fan motor, a brushless DC motor used as a motor for a fan or the like) by a motor drive control device. Such a motor drive control device performs so-called advance-angle control in order to extract motor torque at the maximum when a motor is driven. Under the advance-angle control, the phase of drive current of the motor is adjusted with respect to the rotation phase of the motor.

For example, in a case where a motor is driven according to a 120-degree energization method or the like, the phase may be deviated from an optimum state due to some cause such as abrupt load fluctuation. When the phase is not appropriate, an extra current flows in a coil, resulting in a worsening of the driving efficiency.

With respect to such a situation, it is disclosed in Japanese Patent Application Laid-open No. 2005-312217 that advance-angle reference potential is increased when the value of a load current flowing from a DC power source into an inverter circuit decreases, and also lowered when the value of the load current increases in a device for driving a brushless DC motor for generating a phase signal by a cross-timing between the advance-angle reference potential and an inter-terminal voltage to perform advance-angle control.

In the device for driving the brushless DC motor disclosed in the foregoing Japanese Patent Application Laid-open No. 2005-312217, a phase adjustment is performed depending on whether the value of the load current exceeds a preset current reference value or not. However, since the determination of whether the phase adjustment is performed or not varies depending on a manner of setting the current reference value, it is difficult to perform accurate advance-angle control.

The present disclosure is related to providing a motor drive control device and a motor drive control method capable of easily performing appropriate advance-angle control irrespective of presence of load fluctuation.

SUMMARY

According to a first aspect of the present disclosure, a motor drive control device comprises: a control circuit unit for outputting a drive control signal for performing advance-angle control of a motor to drive the motor; a motor driving unit for outputting a drive signal to the motor with a phase based on the drive control signal output from the control circuit unit to drive the motor; and a current detecting circuit for detecting a voltage value corresponding to a drive current of the motor, wherein the control circuit unit detects a cross-timing between the voltage value detected by the current detecting circuit and each of two or more reference voltage values, and performs the advance-angle control based on a detection result of the cross-timing to adjust a phase of the drive current.

Preferably, the control circuit unit detects a first cross-timing between the voltage value and a first reference voltage value, and a second cross-timing between the voltage value and a second reference voltage value larger than the first reference voltage value when the voltage value increases, detects a third cross-timing between the voltage value and the second reference voltage value and a fourth cross-timing between the voltage value and the first reference voltage value when the voltage value decreases, compares a first interval from the first cross-timing to the second cross-timing with a second interval from the third cross-timing to the fourth cross-timing, and performs the advance-angle control based on a comparison result between the first interval and the second interval.

Preferably, the control circuit unit delays the phase of the drive current by performing the advance-angle control when the second interval is larger than a value obtained by multiplying the first interval by a first predetermined value.

Preferably, the control circuit unit advances the phase of the drive current by performing the advance-angle control when the first interval is larger than a value obtained by multiplying the second interval by a second predetermined value.

Preferably, the control circuit unit performs no advance-angle control when the first cross-timing and the fourth cross-timing are detected, and neither the second cross-timing nor the third cross-timing is detected.

Preferably, the control circuit unit sets the two or more reference voltage values independently of one another.

Preferably, the control circuit unit outputs the drive control signal based on rotation number command information on a rotation number of the motor, and sets the two or more reference voltage values based on the rotation number command information.

According to a second aspect of the present disclosure, a motor drive control method for outputting a drive control signal for performing advance-angle control of a motor to drive the motor, and outputting a drive signal to the motor with a phase based on the drive control signal to drive the motor, comprises: a current detecting step of detecting a voltage value corresponding to a drive current of the motor; a cross-timing detecting step of detecting a cross-timing between the voltage value detected in the current detecting step and each of two or more reference voltage values; and an advance-angle control step of performing the advance-angle control based on a detection result of the cross-timing in the cross-timing detecting step to adjust a phase of the drive current.

According to these disclosures, a motor drive control device and a motor drive control method capable of easily and appropriately performing advance-angle control even in the presence of load fluctuation can be provided.

DETAILED DESCRIPTION

Hereinafter, a motor drive control device according to embodiments of the present disclosure will be described.

Embodiments

Figure 1:
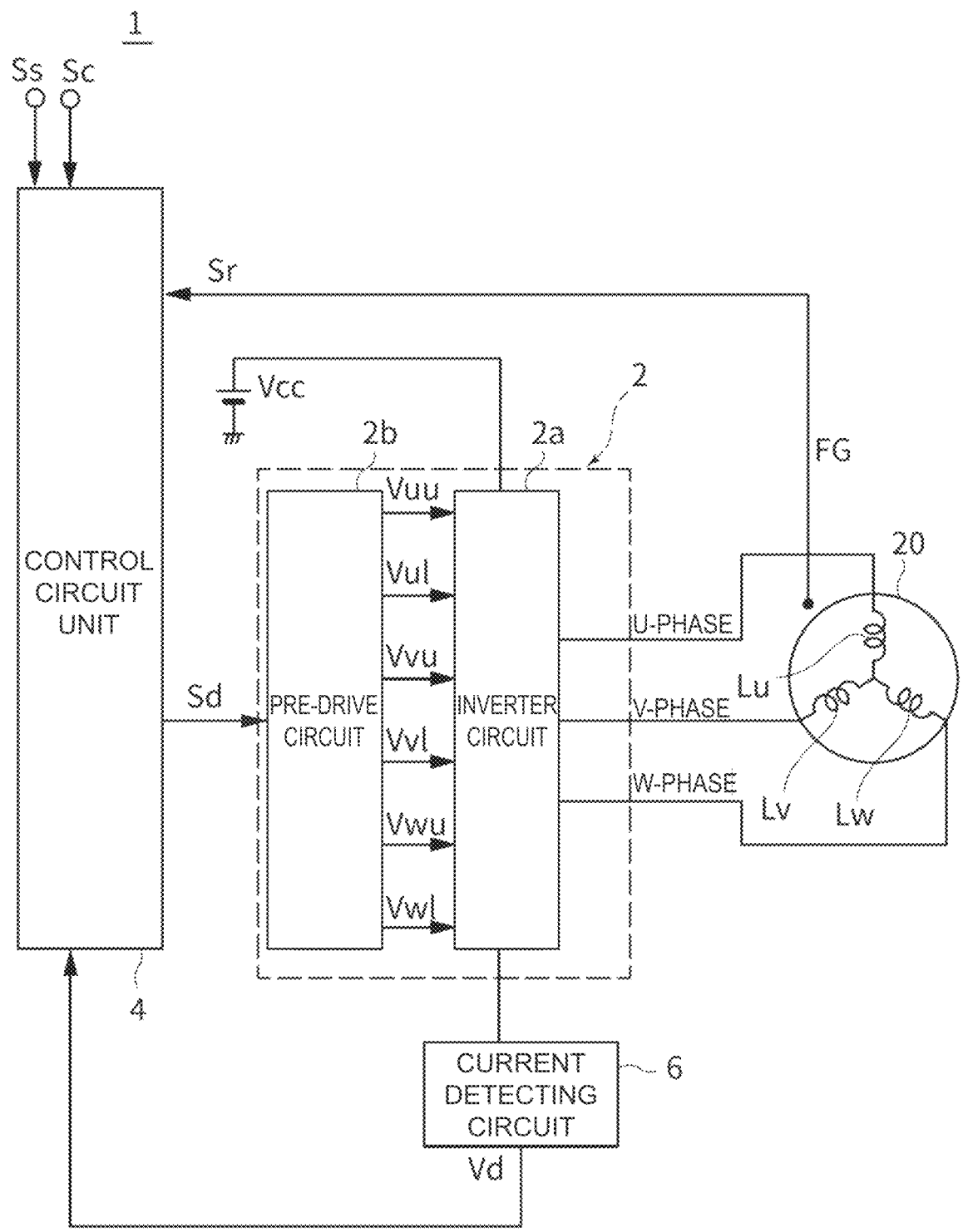
FIG. 1 is a block diagram showing a circuit configuration of a motor drive control device according to a first embodiment of the present disclosure.

FIG. 1 is a block diagram showing a circuit configuration of a motor drive control device according to one of the embodiments of the present disclosure.

As shown in FIG. 1, the motor drive control device 1 is configured so as to drive a motor 20, for example, by a 120-degree energization method. In the present embodiment, the motor 20 is, for example, a three-phase brushless motor. The motor drive control device 1 rotates the motor 20, for example, by making a rectangular driving current flow in armature coils Lu, Lv and Lw of the motor 20 based on a rotational position signal of a rotor. In the present embodiment, the rotational position signal of the rotor is a signal for estimating the rotational position of the rotor from an output signal of a Hall element (not shown).

The motor drive control device 1 includes a motor driving unit 2 having an inverter circuit 2a and a pre-drive circuit 2b, and a control circuit unit 4. The motor 20 is also provided with a current detecting circuit 6. The components of the motor drive control device 1 shown in FIG. 1 is only a part of the whole configuration, and the motor drive control device 1 may be further provided with other components in addition to those shown in FIG. 1.

In the present embodiment, the motor drive control device 1 is an integrated circuit device (IC) incorporated into a package as a whole. A part of the motor drive control device 1 may be incorporated into a package as a single integrated circuit device or the whole or a part of the motor drive control device 1 may be incorporated into a package together with another device to constitute a single integrated circuit device.

The inverter circuit 2a constitutes the motor driving unit 2 together with the pre-drive circuit 2b. The inverter circuit 2a outputs a drive signal to the motor 20 based on an output signal output from the pre-drive circuit 2b, and energizes the armature coils Lu, Lv, and Lw of the motor 20. The inverter circuit 2a is configured, for example, by arranging a pair of series circuits of two switching elements formed at both ends of a DC power source Vcc for each phase (a U phase, a V phase, and a W phase) of the armature coils Lu, Lv, and Lw. In each pair of two switching elements, a terminal of each phase of the motor 20 is connected to a connecting point between the switching elements.

The pre-drive circuit 2b generates an output signal for driving the inverter circuit 2a under the control of the control circuit unit 4, and outputs the generated output signal to the inverter circuit 2a. For example, six types of signals of Vuu, Vul, Vvu, Vvl, Vwu, and Vwl, corresponding to the switching elements of the inverter circuit 2a, are output as the output signal. By outputting these signals, the switching elements corresponding to these signals are turned on or off, and a drive signal is output to the motor 20 to supply power to the respective phases of the motor 20.

In the present embodiment, a rotation number signal Sr, a rotational speed command signal (an example of rotation number command information) Sc and a start signal Ss are input to the control circuit unit 4.

The rotation number signal Sr is input from the motor 20 to the control circuit unit 4. The rotation number signal Sr is, for example, an FG signal corresponding to the rotation of the rotor of the motor 20. The FG signal may be a signal (pattern FG) generated by using a coil pattern provided to a substrate on a rotor side, or a signal (Hall FG) generated by using an output of a Hall element disposed in the motor 20. Furthermore, a rotational position detection circuit may be provided to detect a counter electromotive voltage induced in phases (U, V, and W phases) of the motor 20, and based on the detected counter electromotive voltage, the rotational position and the rotation number of the rotor of the motor 20 may be detected. Still alternatively, a sensor signal of an encoder or the like for detecting the rotation number and the rotational position of the motor 20 may be used.

The rotational speed command signal Sc is input, for example, from the outside of the control circuit unit 4. The rotational speed command signal Sc is a signal relating to the rotation number of the motor 20, and it is a clock signal corresponding to a target rotational speed of the motor 20, for example.

The start signal Ss is input, for example, from the outside of the control circuit unit 4. The start signal Ss is a signal for setting whether the drive control of the motor 20 is performed or a standby state is set without performing the drive control.

The control circuit unit 4 is configured, for example, by a microcomputer, a digital circuit or the like. The control circuit unit 4 outputs a drive control signal Sd to the pre-drive circuit 2b based on the rotation number signal Sr, the rotational speed command signal Sc and the start signal Ss. By outputting the drive control signal Sd, the control circuit unit 4 performs the rotation control of the motor 20 so that the motor 20 rotates at the rotation number corresponding to the rotational speed command signal Sc. That is, the control circuit unit 4 outputs the drive control signal Sd for driving the motor 20 to the motor driving unit 2 to perform the rotation control of the motor 20. Although described in detailed later, a motor drive control method according to the present embodiment includes a current detecting step of outputting a drive control signal Sd for performing advance-angle control of the motor 20 to drive the motor 20, outputting a drive signal to the motor 20 with a phase based on the drive control signal Sd to drive the motor 20, and detecting a voltage value corresponding to a drive current of the motor 20, a cross-timing detecting step of detecting the cross-timing between the voltage value detected in the current detecting step and each of two or more reference voltage values, and an advance-angle control step of performing the advance-angle control based on a detection result of the cross-timing in the cross-timing detecting step to adjust the phase of the drive current.

The current detecting circuit 6 detects the voltage value corresponding to the drive current of the motor 20 (corresponding to a current detecting step in a drive control method of the motor 20). In the present embodiment, a detection voltage signal Vd corresponding to a coil current of the motor 20 is detected as the voltage value corresponding to the drive current of the motor 20. That is, a coil current flowing in each phase of the armature coils Lu, Lv, and Lw of the motor 20 passes through the inverter circuit 2a, passes through a current detection resistor and then flows to GND. Therefore, the current detecting circuit 6 can detect the coil current of the motor 20 as a voltage value from the voltage between both the ends of the current detection resistor. The current detecting circuit 6 outputs a detection voltage signal (an example of the voltage value) Vd as a detection result. The detection voltage signal Vd is input to the control circuit unit 4.

[Description of Control Circuit Unit 4]

Here, the control circuit unit 4 outputs the drive control signal Sd for performing the advance-angle control of the motor 20 to drive the motor 20. Specifically, the control circuit unit 4 outputs the drive control signal Sd based on advance-angle correction value information S10 regarding the advance angle of the motor 20. The motor driving unit 2 outputs the drive signal to the motor 20 with the phase based on the drive control signal Sd to drive the motor 20. That is, the control circuit unit 4 performs the advance-angle control to adjust the phase of the coil current of the motor 20. Although described in detail later, the control circuit unit 4 detects the cross-timing between the detection voltage signal Vd detected by the current detecting circuit 6 and each of a first reference voltage value Va and a second reference voltage value Vb (examples of the two or more reference voltage values), and performs the advance-angle control based on the detection result of the cross-timing, thereby adjusting the phase of the coil current.

Figure 2:
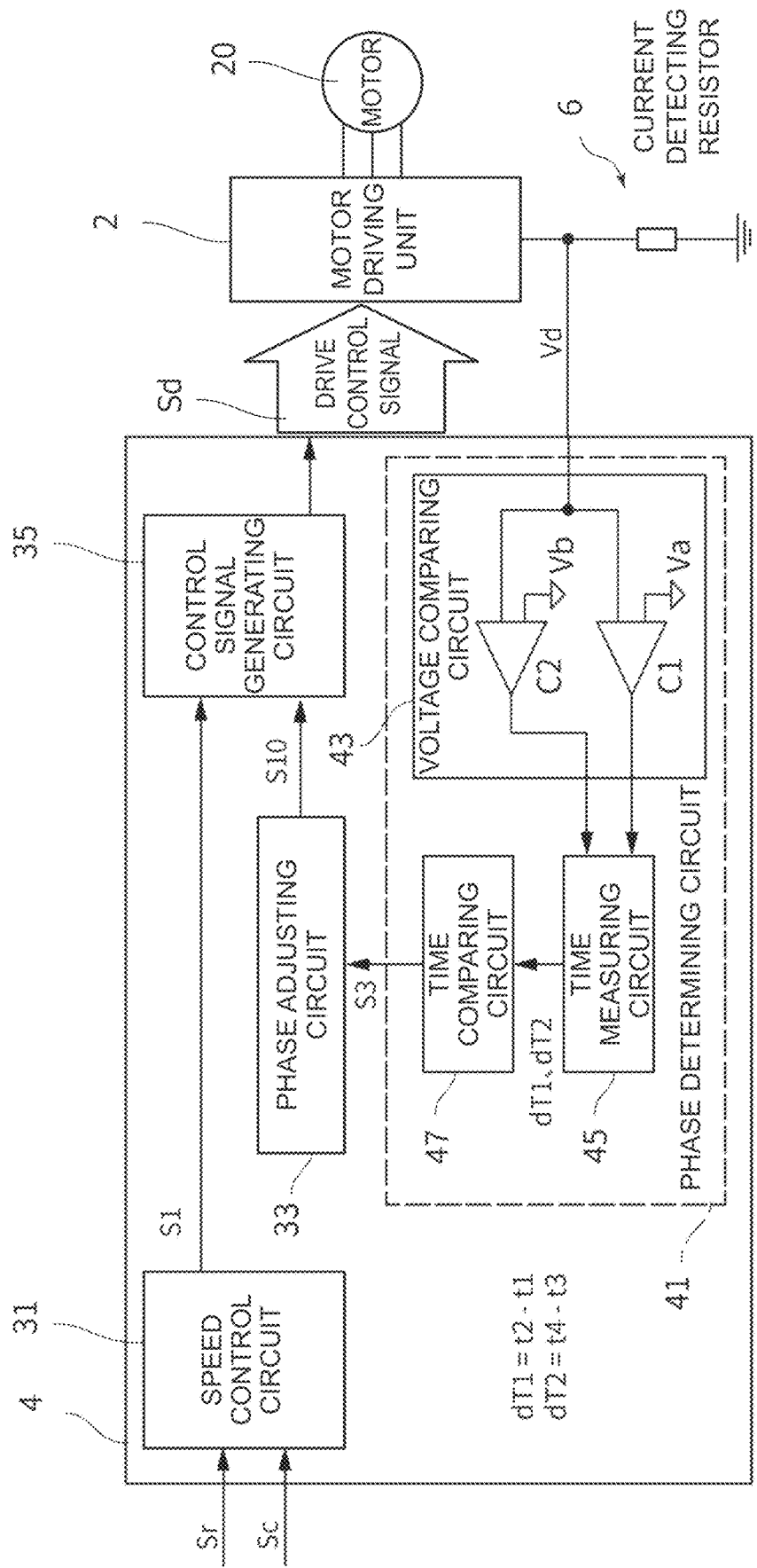
FIG. 2 is a block diagram showing a configuration of a control circuit unit.

FIG. 2 is a block diagram showing a configuration of the control circuit unit 4.

As shown in FIG. 2, the control circuit unit 4 includes a speed control circuit 31, a phase adjusting circuit 33, a control signal generating circuit 35, and a phase determining circuit 41. In FIG. 2, with respect to reception/transmission of signals, information, etc. among the respective circuits, components associated with description on generation of advance-angle correction value information S10 described later are mainly shown.

The rotation number signal Sr and the rotational speed command signal Sc are input to the speed control circuit 31. The speed control circuit 31 outputs a speed control signal S1 based on the rotation number signal Sr and the rotational speed command signal Sc so that the motor 20 rotates at the rotation number corresponding to the rotational speed command signal Sc.

The detection voltage signal Vd of the current detecting circuit 6 is input to the phase determining circuit 41 by using the current detection resistor. The phase determining circuit 41 includes a voltage comparing circuit 43 to which the detection voltage signal Vd is input, a time measuring circuit 45 and a time comparing circuit 47.

The detection voltage signal Vd input to the phase determining circuit 41 is compared with each of the first reference voltage value Va and the second reference voltage value Vb in the voltage comparing circuit 43, and each comparison result is input to the time measuring circuit 45. The first reference voltage value Va is a value smaller than the second reference voltage value Vb.

The voltage comparing circuit 43 is provided with a first comparator C1 and a second comparator C2. The detection voltage signal Vd is input to each of the first comparator C1 and the second comparator C2. The first comparator C1 compares the detection voltage signal Vd with the first reference voltage value Va. The second comparator C2 compares the detection voltage signal Vd with the second reference voltage value Vb. The output of the first comparator C1, that is, the comparison result between the detection voltage signal Vd and the first reference voltage value Va is input to the time measuring circuit 45. The output of the second comparator C2, that is, the comparison result between the detection voltage signal Vd and the second reference voltage value Vb is input to the time measuring circuit 45.

In the present embodiment, the control circuit unit 4 sets the first reference voltage value Va and the second reference voltage value Vb independently of each other. As described above, the control circuit unit 4 sets the first reference voltage value Va and the second reference voltage value Vb based on the rotational speed command signal Sc. Basically, since the coil current of the motor 20 is larger as the rotational speed of the motor 20 is higher, the first reference voltage value Va and the second reference voltage value Vb are set in accordance with this variation of the coil current.

The first reference voltage value Va and the second reference voltage value Vb can be set to be changeable more minutely, for example, by smoothing a voltage generated based on a PWM signal. The method of setting the reference voltage values Va and Vb is not limited to the above method, and various methods such as a method of switching a voltage value to be used among plural preset voltage values with a switch or the like may be used.

The time measuring circuit 45 performs time-counting based on the comparison result of the voltage comparing circuit 43 to detect cross-timings t1, t4 (first cross-timing t1, fourth cross-timing t4) between the detection voltage signal Vd and the first reference voltage value Va, and cross-timings t2, t3 (second cross-timing t2, third cross-timing t3) between the detection voltage signal Vd and the second reference voltage value Vb (corresponding to a cross-timing detecting step in the drive control method of the motor 20).

The time measuring circuit 45 measures a first interval dT1 (the time interval from the first cross-timing t1 to the second cross-timing t2) and a second interval dT2 (the time interval from the third cross-timing t3 to the fourth cross-timing t4). The time-counting is performed by counting the number of clock signals or the like. Information on the measured first interval dT1 and second interval dT2 is transmitted to the time comparing circuit 47.

The time comparing circuit 47 outputs an adjustment request signal S3 relating to phase adjustment based on the first interval dT1 and the second interval dT2 measured by the time measuring circuit 45. The time comparing circuit 47 outputs the adjustment request signal S3 based on a result of the comparison between the first interval dT1 and the second interval dT2. In other words, the time comparing circuit 47 determines whether the first interval dT1 and the second interval dT2 satisfy a predetermined relationship, and outputs the adjustment request signal S3 based on the determination result. The adjustment request signal S3 is, for example, a signal for requesting advance of the phase of the coil current to be output to the motor 20 (advance-angle request event) or a signal for requesting delay of the phase of the coil current (delay-angle request event).

In the present embodiment, the time comparing circuit 47 determines whether the following first expression (1) is satisfied or not.

$$dT2 > K*dT1 \text{ (first predetermined value } K \text{ is a constant equal to 1 or more)} \quad (1)$$

When the first expression (1) is satisfied, the time comparing circuit 47 outputs the adjustment request signal S3 for requesting delay of the phase of the coil current. As a result, the advance-angle control is performed as described later (corresponding to an advance-angle control step in the drive control method of the motor 20). That is, when the second interval dT2 is larger than a value obtained by multiplying the first interval dT1 by a first predetermined value K, the control circuit unit 4 performs the advance-angle control to delay the phase of the coil current.

Furthermore, the time comparing circuit 47 determines whether the following second expression (2) is satisfied or not.

$$dT1 > L*dT2 \text{ (a second predetermined value } L \text{ is a constant equal to 1 or more)} \quad (2)$$

When the second expression (2) is satisfied, the time comparing circuit 47 outputs the adjustment request signal S3 for requesting an advance of the phase of the coil current. As a result, the advance-angle control is performed as described later (corresponding to the advance-angle control step in the drive control method of the motor 20). That is, when the first interval dT1 is larger than a value obtained by multiplying the second interval dT2 by the second predetermined value L, the control circuit unit 4 performs the advance-angle control to advance the phase of the coil current.

The first predetermined value K and the second predetermined value L are appropriately set, and stored in the time comparing circuit 47 in advance. The second predetermined value L may be a value equal to the first predetermined value K or a value different from the first predetermined value K. The first predetermined value K and the second predetermined value L may be appropriately set. For example, when it is more preferable to perform the phase adjustment frequently, the first predetermined value K and the second predetermined value L may be set to relatively small values. Furthermore, when it is more preferable to perform the phase adjustment only in a case where phase shift of the coil current is relatively large, the first predetermined value K and the second predetermined value L may be set to relatively large values. The predetermined values K and L may be preset as coefficients for performing proper phase adjustment, or automatically set according to the rotational speed command signal Sc, the actual rotation number of the motor 20 or the like in the control circuit unit 4.

In the control circuit unit 4, the adjustment request signal S3 output from the time comparing circuit 47 is input to the phase adjusting circuit 33. The phase adjusting circuit 33 generates advance-angle correction value information S10 based on the adjustment request signal S3, and outputs the advance-angle correction value information S10 to the control signal generating circuit 35. The advance-angle correction value information S10 is, for example, a digital signal corresponding to an angle to be advanced. When the adjustment request signal S3 for requesting advance of the phase of the coil current is input, the phase adjusting circuit 33 outputs the advance-angle correction value information S10 so as to advance the phase of the coil current from a just previous phase by only a predetermined angle. Furthermore, when the adjustment request signal S3 for requesting delay of the phase of the coil current is input, the phase adjusting circuit 33 outputs the advance-angle correction value information S10 so as to delay the phase of the coil current from a just previous phase by only a predetermined angle. The amount by which the phase of the coil current is changed at once may be different or identical between the advance-angle case and the delay-angle case.

The control signal generating circuit 35 generates the drive control signal Sd in conformity with an energization switching request for switching an energization phase of the driving signal to a next energization phase, and outputs the drive control signal Sd to the motor driving unit 2. The control signal generating circuit 35 generates the drive control signal Sd based on the input advance-angle correction value information S10 and the speed control signal S1. That is, the drive control signal Sd is generated based on the rotational position signal of the rotor, the advance-angle correction value information S10 and the rotational speed command signal Sc. When the advance-angle correction value information S10 for advancing the phase of the coil current or delaying the phase of the coil current is input, the drive control signal Sd is output according to the input of the advance-angle correction value information S10. In other words, the control signal generating circuit 35 generates the phase-adjusted drive control signal Sd according to a command (advance-angle correction value information S10) output from the phase adjusting circuit 33. The drive signal output from the motor driving unit 2 based on the drive control signal Sd is a signal having a phase adjusted by execution of the advance-angle control.

Here, in the present embodiment, the cross-timings between the detection voltage signal Vd as the voltage value corresponding to the coil current of the motor 20 and the first and second reference voltage values Va and Vb are discriminated from each other as follows. The first cross-timing t1 is a timing of crossing between the detection voltage signal Vd and the first reference voltage value Va when the voltage value corresponding to the coil current of the motor 20 increases. The second cross-timing t2 is a timing of crossing between the detection voltage signal Vd and the second reference voltage value Vb when the voltage value corresponding to the coil current of the motor 20 increases. The third cross-timing t3 is a timing of crossing between the detection voltage signal Vd and the second reference voltage value Vb when the voltage value corresponding to the coil current of the motor 20 decreases. The fourth cross-timing t4 is a timing of crossing between the detection voltage signal Vd and the first reference voltage value Va when the voltage value corresponding to the coil current of the motor 20 decreases. As described above, in the present embodiment, the control circuit unit 4 detects the first cross-timing t1 at which the detection voltage signal Vd and the first reference voltage value Va cross each other, and the second cross-timing t2 at which the detection voltage signal Vd and the second reference voltage value Vb larger than the first reference voltage value Va cross each other when the detection voltage signal Vd increases, detects the third cross-timing t3 at which the detection voltage signal Vd and the second reference voltage value Vb cross each other, and the fourth cross-timing t4 at which the detection voltage signal Vd and the first reference voltage value Va cross each other when the detection voltage signal Vd decreases, compares the first interval dT1 from the first cross-timing t1 to the second cross-timing t2 with the second interval dT2 from the third cross-timing t3 to the fourth cross-timing t4, and performs the advance-angle control based on the comparison result between the first interval dT1 and the second interval dT2.

Figure 3:
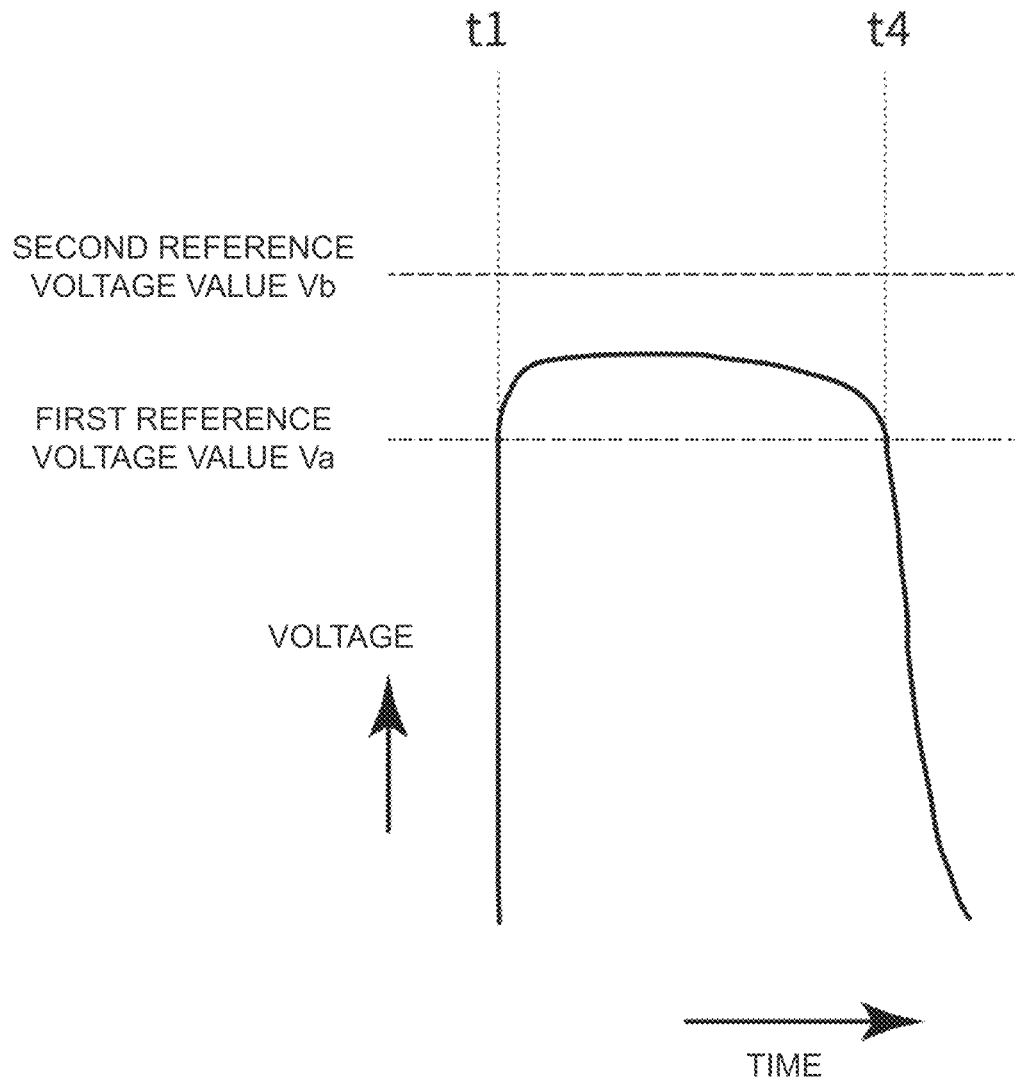
FIG. 3 is a diagram showing the relationship between a voltage value corresponding to a coil current of a motor and first and second reference voltage values.

FIG. 3 is a diagram showing the relationship between the voltage value corresponding to the coil current of the motor 20, and the first reference voltage value Va and the second reference voltage value Vb.

From FIG. 3 to FIG. 6, the abscissa axis represents the time, and the ordinate axis represents the voltage value (detection voltage signal Vd) corresponding to the coil current of the motor 20. The waveforms show transition of the coil current when one energization phase of the motor 20 is energized. Transition of the coil current of the motor 20 when the phase of the coil current is ideal is shown in FIG. 3.

As shown in FIG. 3, the detection voltage signal Vd increases when switching to each energization phase is performed, and then the detection voltage signal Vd decreases when switching to another energization phase is performed. The first reference voltage value Va is set to a value for enabling the detection voltage signal Vd to exceed the first reference voltage value Va, for example, even when the phase of the coil current becomes ideal. On the other hand, the second reference voltage value Vb is set to a value for disabling the detection voltage signal Vd to exceed the second reference voltage value Vb, for example, when the phase of the coil current becomes ideal.

In this case, the time measuring circuit 45 detects the first cross-timing t1 and the fourth cross-timing t4, but does not detect the second cross-timing t2 and the third cross-timing t3. In this case, the motor 20 is driven under an efficient state, and it is unnecessary to perform the phase adjustment of the coil current, so that the control circuit unit 4 does not perform the phase adjustment. That is, the phase adjusting circuit 33 does not output the advance-angle correction value information S10 for changing the phase of the coil current.

Figure 4:
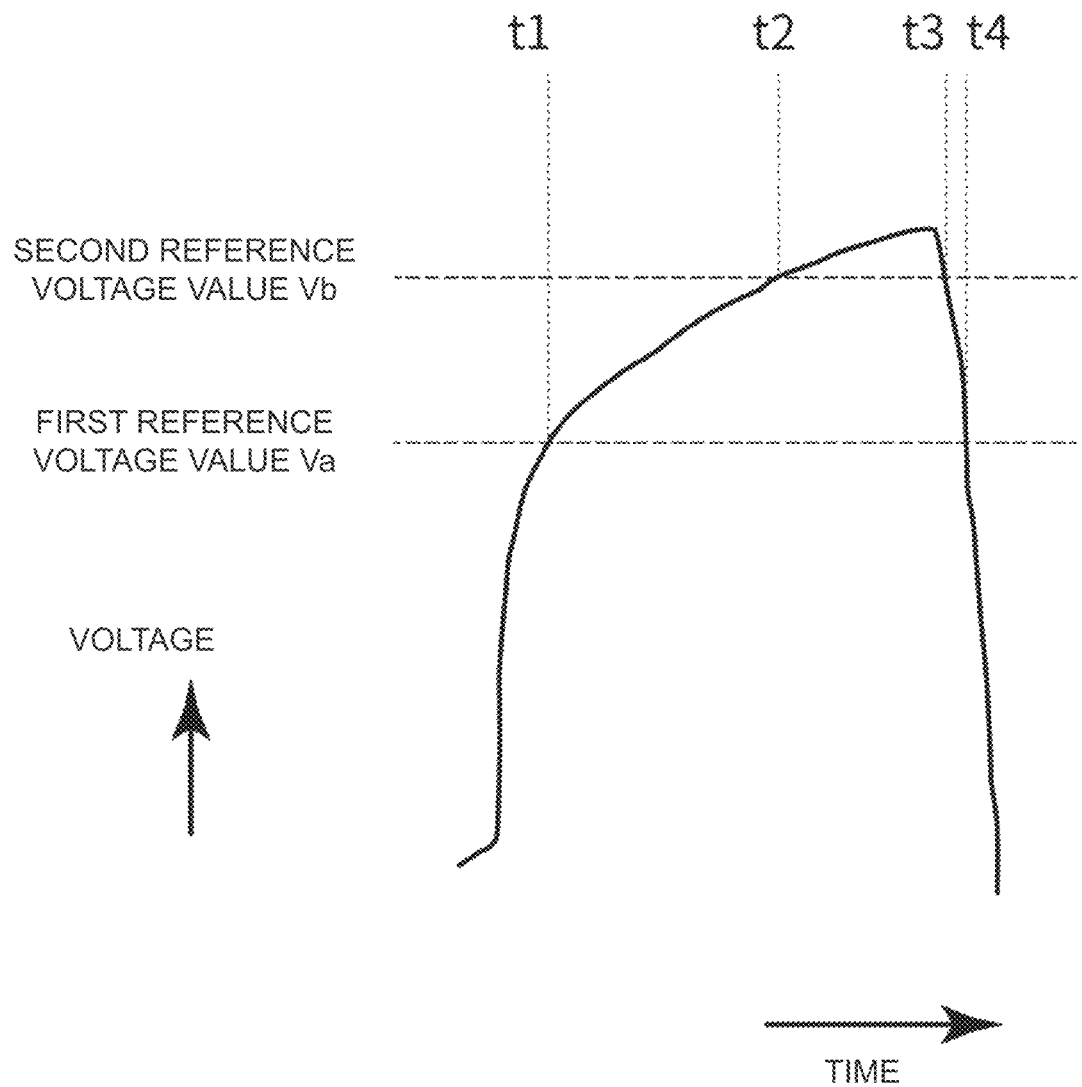
FIG. 4 is a first diagram showing the relationship between the voltage value corresponding to the coil current of the motor and the first and second reference voltage values when the phase of the coil current is not ideal.

FIG. 4 is a first diagram showing the relationship between the voltage value corresponding to the coil current of the motor 20, and the first reference voltage value Va and the second reference voltage value Vb when the phase of the coil current is not ideal.

A transition of the coil current of the motor 20 when the phase of the coil current lags with respect to the ideal phase is shown in FIG. 4.

As shown in FIG. 4, when the phase of the coil current lags with respect to the ideal phase, the detection voltage signal Vd increases gradually from the time when switching to each energization phase is performed, and then the detection voltage signal Vd is prone to increase until just before switching to another energization phase is performed. Then, when switching to the other energization phase is performed, the detection voltage signal Vd decreases. At this time, the detection voltage signal Vd as the voltage value corresponding to the coil current of the motor 20 exceeds the second reference voltage value Vb. That is, in this case, the time measuring circuit 45 successively measures the first cross-timing t1, the second cross-timing t2, the third cross-timing t3 and the fourth cross-timing t4.

When the phase of the coil current lags with respect to the ideal phase, the coil current increases gradually during an energization period in each energization phase. Therefore, a timing at which the detection voltage signal Vd reaches the second reference voltage value Vb is a timing relatively-near the end of the energization period in each energization phase. That is, the second interval dT2 is shorter than the first interval dT1.

Figure 5:
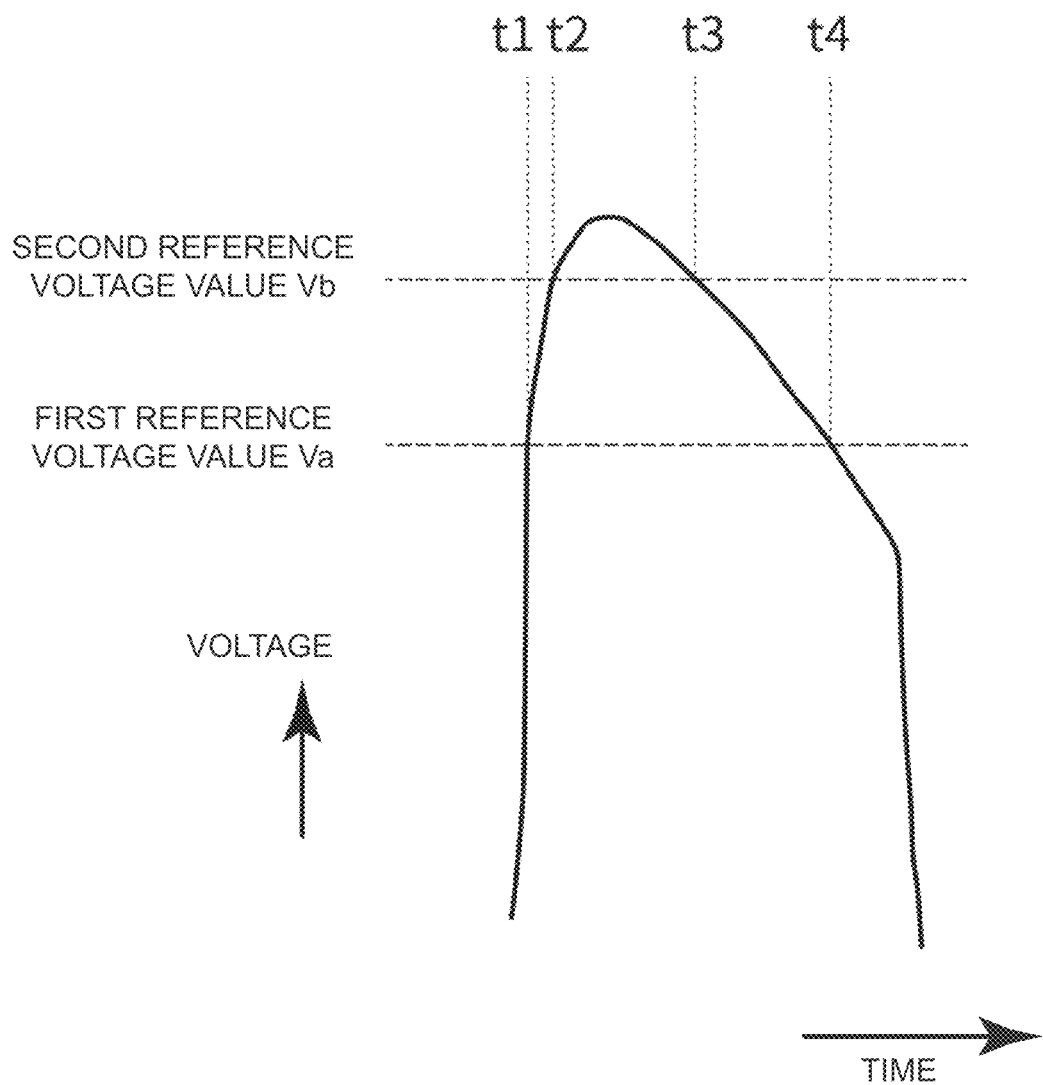
FIG. 5 is a second diagram showing the relationship between the voltage value corresponding to the coil current of the motor and the first and second reference voltage values when the phase of the coil current is not ideal.

FIG. 5 is a second diagram showing the relationship between the voltage value corresponding to the coil current of the motor 20 and the first voltage value Va and the second reference voltage value Vb when the phase of the coil current is not ideal.

A transition of the coil current of the motor 20 when the phase of the coil current advances with respect to the ideal phase is shown in FIG. 5.

As shown in FIG. 5, when the phase of the coil current advances with respect to the ideal phase, the detection voltage signal Vd increases rapidly when switching to each energization phase is performed, and the detection voltage signal Vd decreases gradually after the detection voltage signal Vd reaches a maximum value and until just before switching to another energization phase is performed. At this time, the detection voltage signal Vd as the voltage value corresponding to the coil current of the motor 20 exceeds the second reference voltage value Vb. That is, in this case, the time measuring circuit 45 also successively measures the first cross-timing t1, the second cross-timing t2, the third cross-timing t3 and the fourth cross-timing t4.

When the phase of the coil current advances, the coil current of the motor 20 rapidly increases, and then gradually decreases during the energization period in each energization phase. Therefore, a timing at which the detection voltage signal Vd reaches the second reference voltage value Vb becomes a timing relatively-near the start of the energization period in each energization phase. That is, the second interval dT2 is longer than the first interval dT1.

As described above, when the phase of the coil current lags or advances with respect to the ideal phase, some difference occurs between the first interval dT1 and the second interval dT2. In the present embodiment, the control circuit unit 4 detects whether the difference between the first interval dT1 and the second interval dT2 exceeds a predetermined level determined by the first predetermined value K or the second predetermined value L, thereby detecting whether the phase of the coil current advances or lags with respect to the ideal phase. When detecting that the difference between the first interval dT1 and the second interval dT2 exceeds the predetermined level, the control circuit unit 4 performs the advance-angle control to adjust the phase of the coil current.

Figure 6:
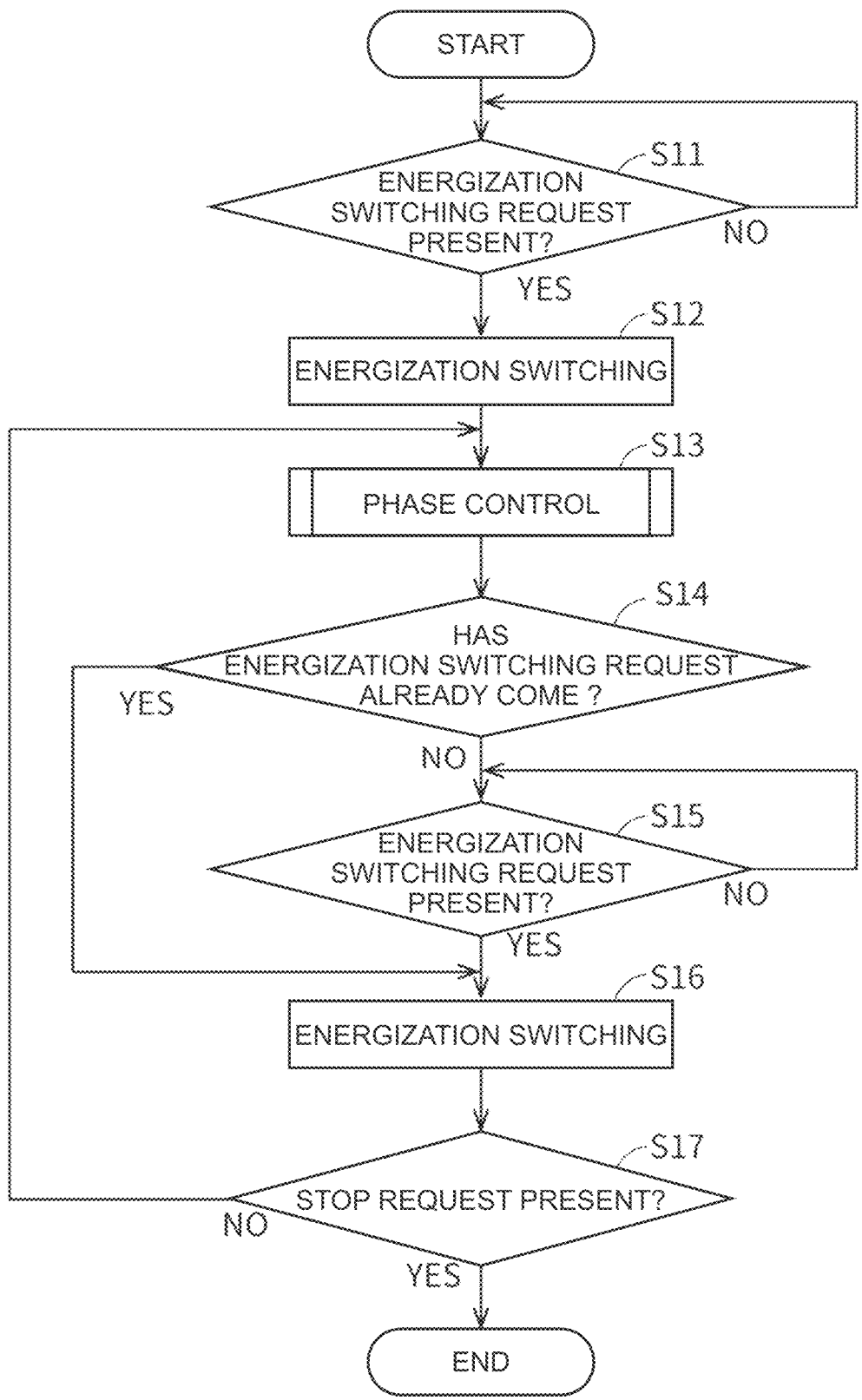
FIG. 6 is a flowchart showing an operation of the control circuit unit.

FIG. 6 is a flowchart showing the operation of the control circuit unit 4.

As shown in FIG. 6, the control circuit unit 4 performs the following control operation when driving of the motor 20 is started.

In step S11, the control signal generating circuit 35 of the control circuit unit 4 determines whether an energization switching request is present or not. When the energization switching request is present (YES), the control signal generating circuit 35 goes to step S12 to perform energization switching. When no energization switching request is present (NO), the control signal generating circuit 35 repetitively performs the processing of step S11 until the energization switching request is present.

In step S13, the control circuit unit 4 performs phase control processing as described later.

When the phase control processing is finished, in step S14, the control signal generating circuit 35 determines whether a next energization switching request has already come. When the energization switching request has already come (YES), the control signal generating circuit 35 goes to step S16. When no energization switching request has come (NO), the control signal generating circuit 35 goes to step S15.

In step S15, the control signal generating circuit 35 determines whether an energization switching request is present. When an energization switching request is present (YES), the control signal generating circuit 35 goes to step S16. When no energization switching request is present (NO), the control signal generating circuit 35 repetitively performs the processing of step S15 until the energization switching request is present.

In step S16, the control signal generating circuit 35 performs energization switching, and outputs the drive control signal Sd.

In step S17, the control circuit unit 4 determines whether a stop request is present or not. When the stop request is present (YES), a series of processing is finished, and the motor 20 is stopped. When no stop request is present (NO), the processing of step S13 and subsequent steps is performed again.

Figure 7:
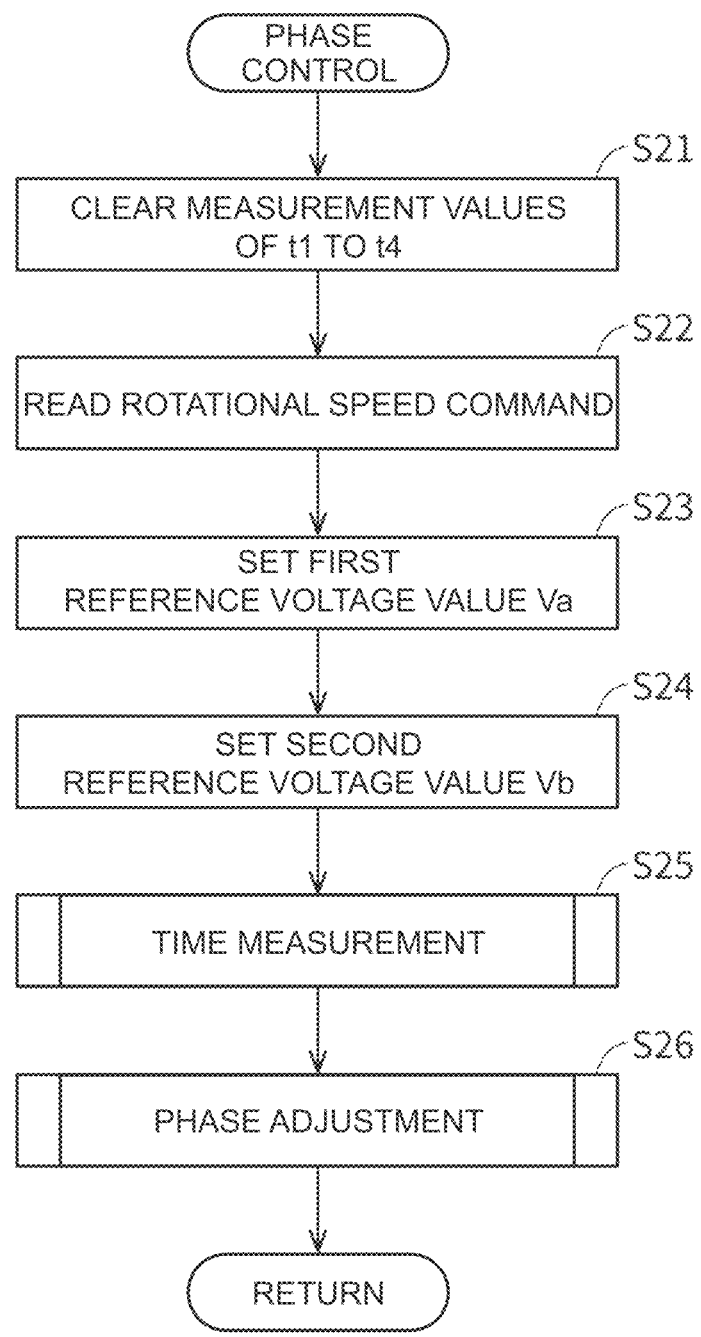
FIG. 7 is a flowchart showing an operation of phase control processing.

FIG. 7 is a flowchart showing the operation of the phase control processing.

As shown in FIG. 7, in step S21, the time measuring circuit 45 clears the measurement values of the cross-timings t1, t2, t3 and t4. The measurement values are stored in a memory or the like, for example, in the control circuit unit 4.

In step S22, the voltage comparing circuit 43 reads the rotational speed command signal Sc.

In step S23, the voltage comparing circuit 43 sets the first reference voltage value Va according to the rotational speed command signal Sc.

In step S24, the voltage comparing circuit 43 sets the second reference voltage value Vb according to the rotational speed command signal Sc.

In step S25, the time measuring circuit 45 performs the time measurement processing as described later to measure the cross-timings t1, t2, t3 and t4.

In step S26, the phase adjusting circuit 33 performs the phase adjustment processing responding to the adjustment request signal S3 to be generated/output in the time comparing circuit 47 based on the measurement result of the time measurement processing by the time measuring circuit 45 (outputs the advance-angle correction value information S10), whereby the phase of the drive control signal Sd to be generated in the control signal generating circuit 35 is adjusted. By performing the advance-angle control as described above, the phase of the coil current is adjusted.

Figure 8:
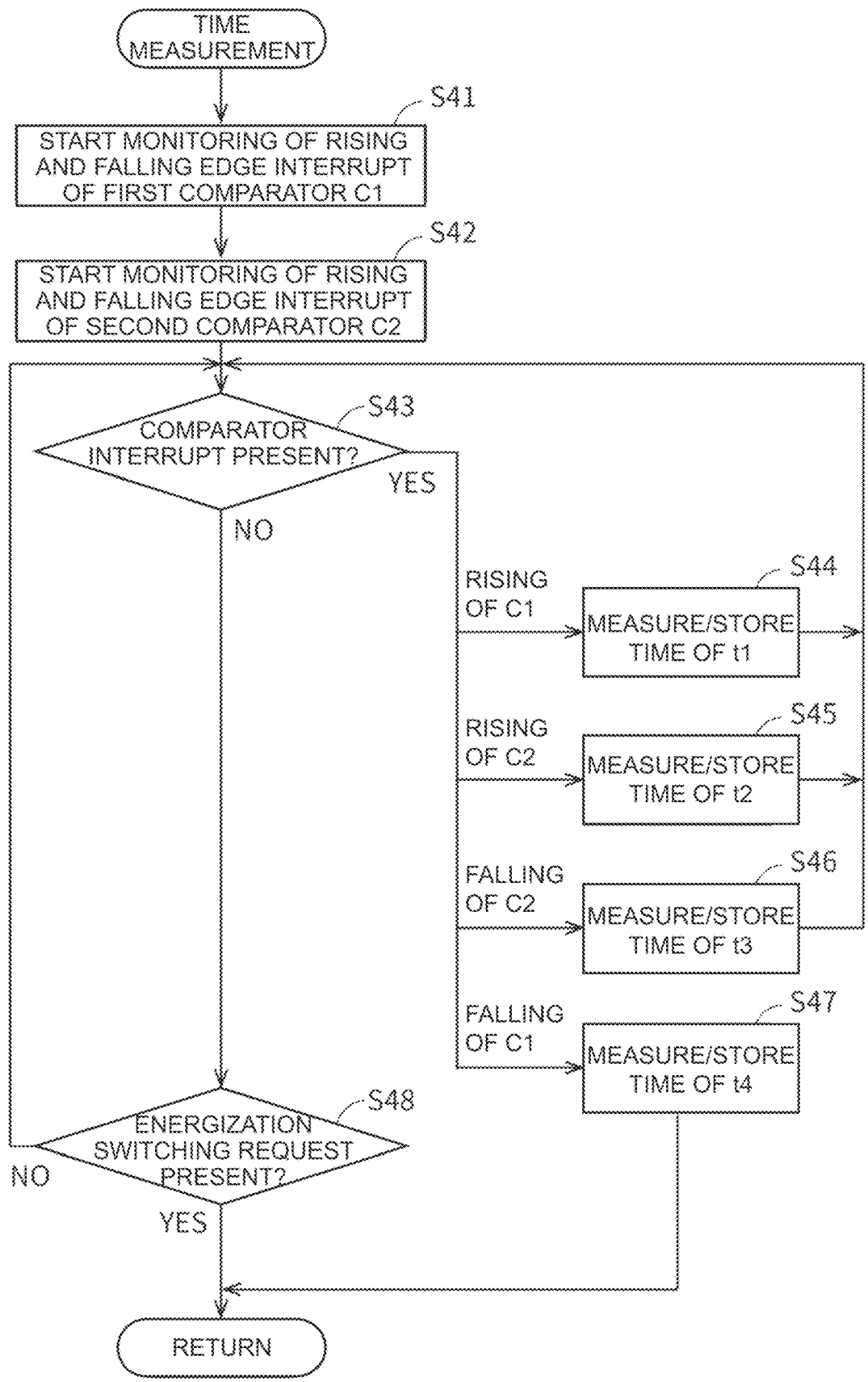
FIG. 8 is a flowchart showing an operation of time measurement processing.

FIG. 8 is a flowchart showing the operation of the time measurement processing. This flowchart corresponds to the cross-timing detecting step in the drive control method of the motor 20 described above.

In step S41, the time measuring circuit 45 starts to monitor the output result of the first comparator C1. That is, the time measuring circuit 45 monitors whether a rising edge or a falling edge occurs in the output voltage of the first comparator C1. When a rising edge or a falling edge occurs, the time measuring circuit 45 detects it as an edge interrupt.

In step S42, the time measuring circuit 45 starts to monitor the output result of the second comparator C2. That is, the time measuring circuit 45 monitors whether a rising edge or a falling edge occurs in the output voltage of the second comparator C2. When a rising edge or a falling edge occurs, the time measuring circuit 45 detects it as an edge interrupt.

In step S43, the time measuring circuit 45 determines whether an edge interrupt is detected in the comparators C1 and C2.

When a rising edge is detected in the first comparator C1 (YES in step S43), in step S44, the time measuring circuit 45 measures the first cross-timing t1, and stores the measured first cross-timing t1 into a memory or the like. Therefore, the time measuring circuit 45 returns to step S43.

When a rising edge is detected in the second comparator C2 (YES in step S43), in step S45, the time measuring circuit 45 measures the second cross-timing t2, and stores the measured second cross-timing t2 into the memory or the like. Thereafter, the time measuring circuit 45 returns to step S43.

When a falling edge is detected in the second comparator C2 (YES in step S43), in step S46, the time measuring circuit 45 measures the third cross-timing t3, and stores the measured third cross-timing t3 into the memory or the like in the control circuit unit 4. Thereafter, the time measuring circuit 45 returns to step S43.

When a falling edge is detected in the first comparator C1 (YES in step S43), in step S47, the time measuring circuit 45 measures the fourth cross-timing t4, and stores the measured fourth cross-timing t4 into the memory or the like in the control circuit unit 4. When the processing of step S47 is performed, the time measurement processing is finished, and the time measuring circuit 45 returns to the processing of FIG. 7.

Even in a case where the measurement of the fourth cross-timing t4 is not performed, the time measurement processing is finished when a next energization switching request is present. That is, when no edge interrupt is detected in step S43 (NO), and further when a next energization switching request is present in step S48 (YES), the time measuring circuit 45 finishes the time measurement processing, and returns to the processing of FIG. 7. In other words, the detection of the edge interrupt is continued until the measurement of the fourth cross-timing t4 is performed or a next energization switching request is present.

Figure 9:
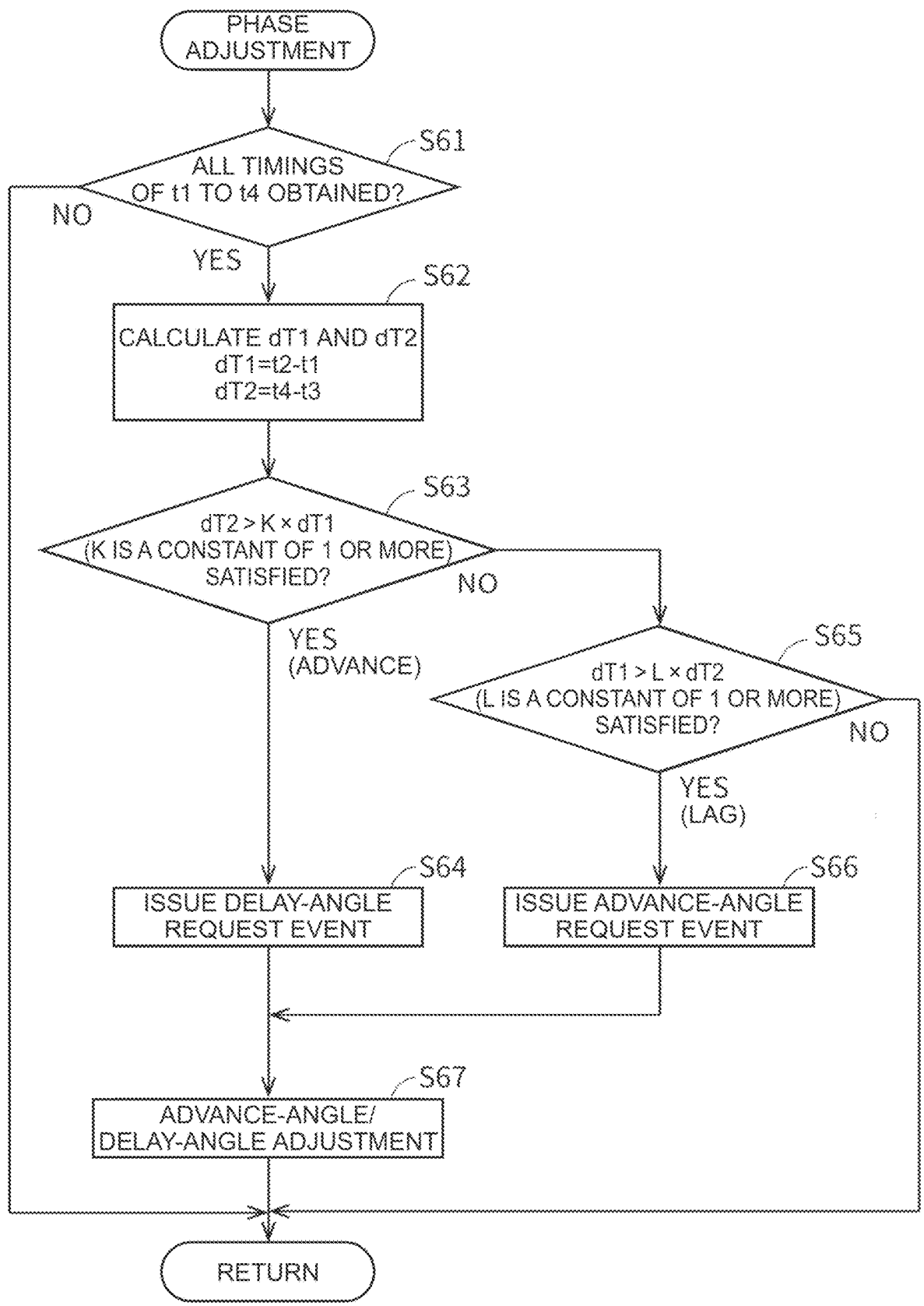
FIG. 9 is a flowchart showing phase adjustment processing.

FIG. 9 is a flowchart showing the phase adjustment processing. This flowchart corresponds to the advance-angle control step in the drive control method of the motor 20 described above.

As shown in FIG. 9, in step S61, the time measuring circuit 45 determines whether all the cross-timings t1, t2, t3 and t4 have been obtained (measured). When all the cross-timings t1, t2, t3 and t4 have been obtained (YES), the time measuring circuit 45 proceeds to the processing of step S62.

When none of the cross-timings t1, t2, t3 and t4 has been obtained (NO) in step S61, the phase adjustment processing is finished. That is, in this case, the phase adjustment is not performed. For example, when the phase of the coil current is appropriate as shown in FIG. 3, the first cross-timing t1 and the fourth cross-timing t4 are measured, and the second cross-timing t2 and the third cross-timing t3 are not measured. In such a case, the phase adjustment is not performed, and switching to a next energization phase is performed without changing the phase.

In step S62, the time measuring circuit 45 calculates the first interval dT1. The first interval dT1 is a time period from the first cross-timing t1 to the second cross-timing t2.

$$dT1=t2-t1$$

The time measuring circuit 45 calculates the second interval dT2. The second interval dT2 is a time period from the third cross-timing t3 to the fourth cross-timing t4.

$$dT2=t4-t3$$

In step S63, the time comparing circuit 47 determines whether the first interval dT1 and the second interval dT2 satisfy a predetermined first relationship. More specifically, the time comparing circuit 47 determines whether the second interval dT2 is larger than a value obtained by multiplying the first interval dT1 by a first predetermined value K (K is a constant of 1 or more) (an example of the first relationship). That is, the time comparing circuit 47 determines whether the following first expression (1) is satisfied.

$$dT2>K*dT1 \text{ (the first predetermined value } K \text{ is a constant of 1 or more)} \quad (1)$$

When the first relationship is satisfied, that is, the first expression (1) is satisfied (YES), it can be determined that the phase of the present coil current advances with respect to the ideal phase. In this case, the time comparing circuit 47 goes to step S64. When the first relationship is not satisfied, that is, the first expression (1) is not satisfied (NO), the time comparing circuit 47 goes to step S65.

In step S64, the time comparing circuit 47 issues a delay-angle request event. That is, the time comparing circuit 47 outputs, to the phase adjusting circuit 33, an adjustment request signal S3 for delaying the phase of the coil current to be output to the motor 20.

In step S65, the time comparing circuit 47 determines whether the first interval dT1 and the second interval dT2 satisfy a predetermined second relationship. More specifically, the time comparing circuit 47 determines whether the first interval dT1 is larger than a value obtained by multiplying the second interval dT2 by a second predetermined value L (L is a constant of 1 or more) (an example of the second relationship). That is, the time comparing circuit 47 determines whether the following second expression (2) is satisfied.

$$dT1>L*dT2 \text{ (the second predetermined value } L \text{ is a constant of 1 or more)} \quad (2)$$

When the second relationship is satisfied, that is, the second expression (2) is satisfied (YES), it can be determined that the phase of the present coil current lags with respect to the ideal phase. In this case, the time comparing circuit 47 goes to step S66. When the second relationship is not satisfied, that is, the second expression (2) is not satisfied (NO), the phase adjustment processing is finished. That is, when the relationship between the first interval dT1 and the second interval dT2 satisfies neither the first relationship nor the second relationship, it is not determined whether the phase of the present coil current advances or lags with respect to the ideal phase, so the phase adjustment is not performed.

In step S66, the time comparing circuit 47 issues an advance-angle request event. That is, the time comparing circuit 47 outputs, to the phase adjusting circuit 33, an adjustment request signal S3 for requesting advance of the phase of the coil current to be output to the motor 20.

When the processing of step S64 or step S66 is executed, in step S67, the advance-angle/delay-angle adjustment is performed. That is, the phase adjusting circuit 33 generates advance-angle correction value information S10 based on the adjustment request signal S3 output from the time comparing circuit 47, and outputs the generated advance-angle correction value information S10 to the control signal generating circuit 35. When the delay-angle request event is issued, the phase adjusting circuit 33 outputs the advance-angle correction value information S10 so as to delay the phase of the coil current by only a predetermined angle from the immediately preceding phase of the coil current. When the advance-angle request event is issued, the phase adjusting circuit 33 outputs the advance-angle correction value information S10 so as to advance the phase of the coil current by only a predetermined angle from the immediately preceding phase of the coil current. The control signal generating circuit 35 advances or delays the phase of the drive control signal Sd according to the advance-angle correction value information S10, and outputs the drive control signal Sd. By performing the advance-angle control and outputting the drive control signal Sd as described above, the phase of the coil current is adjusted.

When the processing of step S67 is finished, the phase adjustment processing is finished. As a result, switching of the energization phase is performed according to a next energization switching request as shown in FIG. 6.

As described above, in the present embodiment, whether the phase of the present coil current advances or lags is determined according to the cross-timings t1, t2, t3 and t4 between the detection voltage signal Vd detected in the current detecting circuit 6 and each of the first reference voltage value Va and the second reference voltage value Vb. When the phase of the present coil current advances or lags, the phase of the coil current is adjusted. Accordingly, even in the presence of load fluctuation, it is easily determined whether phase adjustment is necessary or not, and appropriate advance-angle control can be performed.

Figure 10:
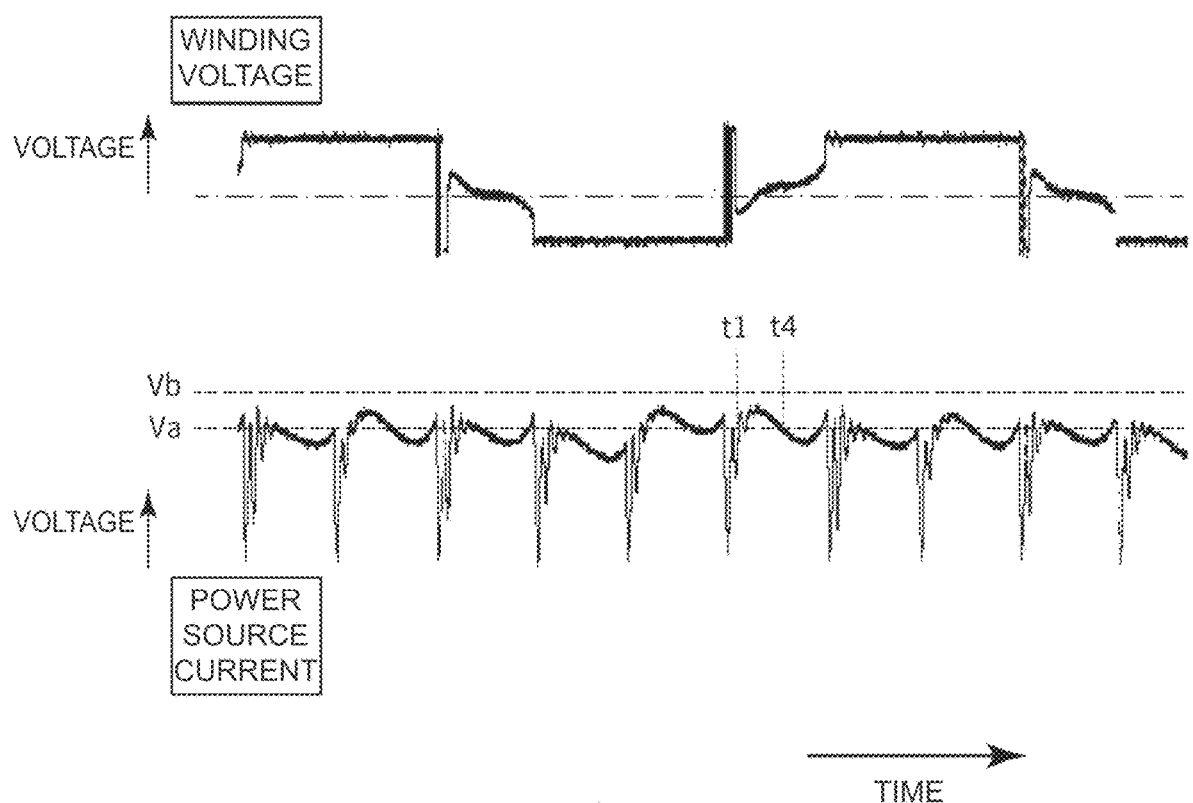
FIG. 10 is a diagram showing examples of waveforms of a winding voltage and a power source current when the power source current has an ideal phase.

FIG. 10 is a diagram showing examples of waveforms of a winding voltage and a power source current when the power source current has an ideal phase.

In the present embodiment, the detection voltage signal Vd corresponding to the coil current of the motor 20 is detected as the voltage value corresponding to the drive current of the motor 20 by the current detecting circuit 6. However, a voltage value corresponding to a power source current flowing from a power source Vcc may be detected as the voltage value corresponding to the drive current of the motor 20. That is, by comparing the voltage value corresponding to the power source current with two or more reference voltage values, it may be determined whether the phase of the present coil current advances or lags.

Figure 11:
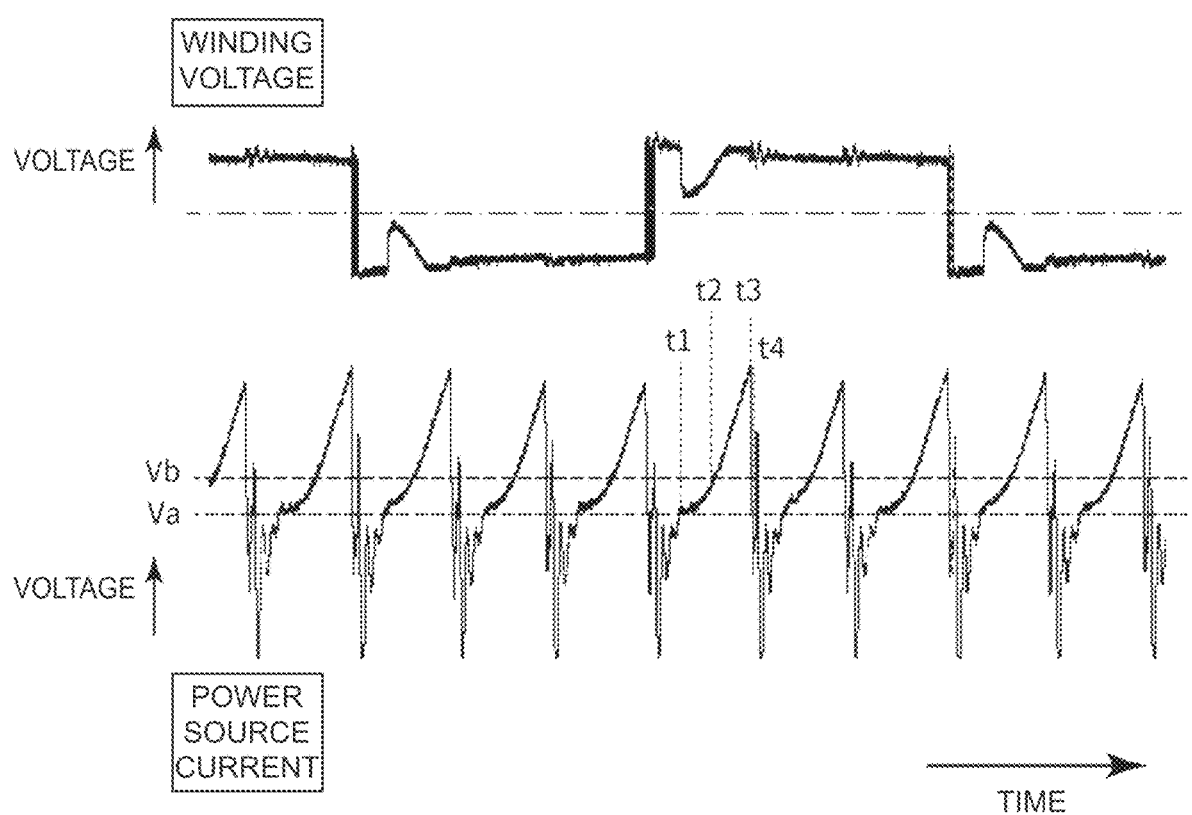
FIG. 11 is a diagram showing examples of waveforms of the winding voltage and the power source current when the power source current lags with respect to the ideal phase.
Figure 12:
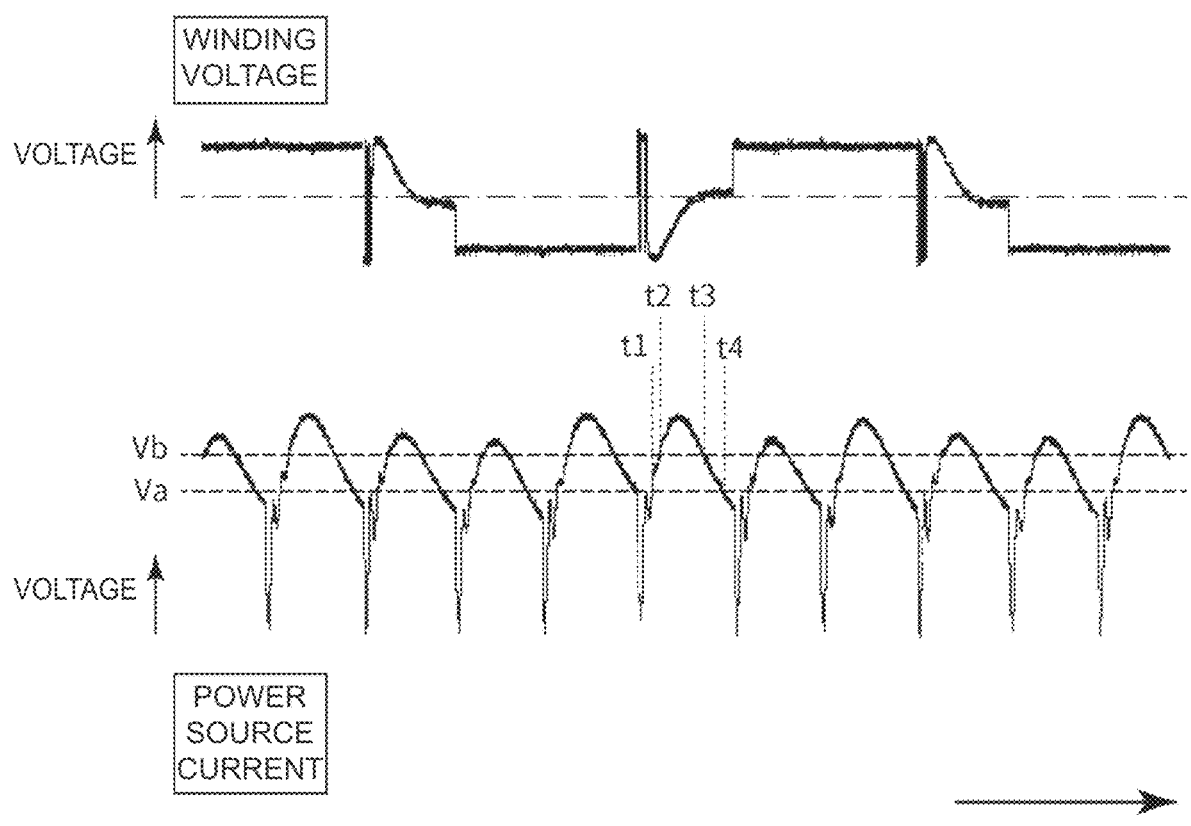
FIG. 12 is a diagram showing examples of waveforms of the winding voltage and the power source current when the power source current advances with respect to the ideal phase.

Examples in which the voltage value corresponding to the power source current is compared with the first reference voltage value Va and the second reference voltage value Vb are shown in FIG. 10 and the following FIGS. 11 and 12.

As shown in FIG. 10, the voltage of one coil (for example, coil Lu) is shown as a winding voltage. In each coil, by switching the energization phase, an energization phase to which a positive voltage is applied and an energization phase to which a negative voltage is applied are alternately repeated while interposing an energization phase having a voltage of zero between both the above energization phases.

The voltage value corresponding to the power source current increases from a low value to a high value and then returns to a low value every time the energization phase is switched.

In FIG. 10, the voltage value corresponding to the power source current exceeds the first reference voltage value Va, but does not exceed the second reference voltage value Vb.

In this case, only the first cross-timing t1 and the fourth cross-timing t4 are measured, and the second cross-timing t2 and the third cross-timing t3 are not measured. That is, it is determined that the phase of the power source current is an ideal phase, and no phase adjustment is performed. In other words, when the phase of the power source current is an ideal phase as described above, the first reference voltage value Va and the second reference voltage value Vb are set so that the voltage value corresponding to the power source current does not exceed the second reference voltage value Vb even when the voltage value exceeds the first reference voltage value Va.

FIG. 11 is a diagram showing examples of waveforms between the winding voltage and the power source current when the power source current lags with respect to the ideal phase.

As shown in FIG. 11, when the phase of the power source current lags with respect to the ideal phase, the voltage value corresponding to the power source current is initially small, and gradually increases for each energization phase. Even after exceeding the first reference voltage value Va, the voltage value increases gradually, and also exceeds the second reference voltage value Vb. Accordingly, the first cross-timing t1, the second cross-timing t2, the third cross-timing t3 and the fourth cross-timing t4 are measured, and it is determined that the phase of the power source current lags with respect to the ideal phase.

FIG. 12 is a diagram showing examples of waveforms of the winding voltage and the power source current when the power source current advances with respect to the ideal phase.

As shown in FIG. 12, when the phase of the power source current advances with respect to the ideal phase, for each energization phase, the voltage value corresponding to the power source current rapidly increases initially, and gradually decreases after exceeding the first reference voltage value Va and the second reference voltage value Vb. Accordingly, the first cross-timing t1, the second cross-timing t2, the third cross-timing t3 and the fourth cross-timing t4 are measured, and it is determined that the phase of the power source current advances with respect to the ideal phase.

Waveforms in a case where the advance-angle control as presented in the present embodiment is not executed are shown in FIGS. 11 and 12.

As described above, in the present embodiment, it is possible to easily and appropriately perform the advance-angle control even in the presence of load fluctuation. Since it can be determined based on the waveform of the drive current of the motor 20 whether the advance-angle or delay-angle adjustment is necessary or not, the phase adjustment can be appropriately performed. The determination of the phase of the present drive current, that is, the determination on whether the phase adjustment is necessary or not can be performed by using the comparators C1, C2. Accordingly, even when the capacity of a microcomputer used for the control circuit unit 4 is low, the determination of the phase can be appropriately performed, and the motor drive control device 1 can be realized with an inexpensive configuration.

The first reference voltage value Va and the second reference voltage value Vb are respectively appropriately set according to the rotational speed command signal Sc, etc. Accordingly, the advance-angle control can be appropriately performed in a wide rotational speed range, and the motor 20 can be efficiently driven.

Since it has been conventionally impossible to perform the advance-angle control, an advance-angle value has been fixed in advance in some cases so that the motor 20 is driven with a slight advance angle in preparation for a case where the motor 20 is driven at a relatively high rotational speed. On the other hand, in the present embodiment, it is possible to perform the advance-angle control by automatic feedback control, so that the phase can be adjusted to a proper phase at all times, and the motor 20 can be driven with high efficiency.

[Others]

The motor drive control device is not limited to the circuit configurations shown in the foregoing embodiment and modifications of the embodiment. Various circuit configurations configured so as to fit the purpose of the present disclosure may be applied.

The number of the reference voltage values is not limited to two, and may be three or more. Even in this case, the advance-angle control can be performed by measuring the cross-timing at which each reference voltage value and the voltage value corresponding to the drive current of the motor cross each other and determining whether the phase of the drive current advances or lags.

The reference voltage value may be set in consideration of not only the rotational speed command signal, but also the actual rotation number of the motor. For example, a table, a mathematical expression or the like associated with the rotational speed command signal and the actual rotation number of the motor may be preset, and the reference voltage value may be set based on the table, the mathematical expression or the like. Furthermore, when the motor is rotated at a constant speed for a fixed time, the reference voltage value corresponding to the speed may be set.

The rotational speed command signal input to the control circuit unit may be generated inside the motor drive control device.

The motor to be driven by the motor drive control device of the present embodiment is not limited to a three-phase brushless motor, but may be another type of motor. Furthermore, the number of phases of the motor is not limited to three phases.

The present disclosure is not limited to a motor drive control device for driving a motor by a 120-degree energization driving method, but may be applied to a motor drive control device for driving a motor by another method.

The foregoing flowcharts, etc. show examples for describing the operations, and are not limited to these examples. The steps shown in each figure of the flowchart are specific examples, and are not limited to this flow. For example, the order of respective steps may be changed, another processing may be inserted between respective steps, or the processing may be parallelized.

Some or all of the processing in the foregoing embodiment may be performed by software or may be performed by using hardware circuits. For example, the controller is not limited to a microcomputer. The internal configuration in the controller may be set so that at least a part of the configuration is processed by software.

It should be noted that the foregoing embodiment is exemplificative, and not restrictive in all points. The scope of the present disclosure is presented not by the foregoing description, but by the claims, and it is intended that all alterations within meaning and scope equivalent to the claims are included.

What is claimed is:

1. A motor drive control device comprising:
    a control circuit for outputting a drive control signal for performing advance-angle control on a motor to drive the motor;

a motor driving unit for outputting a drive signal to the motor with a phase based on the drive control signal output from the control circuit to drive the motor; and a current detecting circuit for detecting a voltage value corresponding to a drive current of the motor, wherein the control circuit detects cross-timings between the voltage value detected by the current detecting circuit, and each of two or more reference voltage values, wherein at least one of the two or more reference voltage values is larger than another one of the two or more reference voltage values, and performs the advance-angle control based on time interval(s) between the detected cross-timings to adjust a phase of the drive current, wherein the control circuit detects a first cross-timing between the voltage value and a first reference voltage value, and a second cross-timing between the voltage value and a second reference voltage value larger than the first reference voltage value when the voltage value increases, detects a third cross-timing between the voltage value and the second reference voltage value and a fourth cross-timing between the voltage value and the first reference voltage value when the voltage value decreases, compares a first interval from the first cross-timing to the second cross-timing with a second interval from the third cross-timing to the fourth cross-timing, and performs the advance-angle control based on a comparison result between the first interval and the second interval.

2. The motor drive control device according to claim 1, wherein the control circuit delays the phase of the drive current by performing the advance-angle control when the second interval is larger than a value obtained by multiplying the first interval by a first predetermined value.

3. The motor drive control device according to claim 1, wherein the control circuit advances the phase of the drive current by performing the advance-angle control when the first interval is larger than a value obtained by multiplying the second interval by a second predetermined value.

4. The motor drive control device according to claim 1, wherein the control circuit performs no advance-angle control when the first cross-timing and the fourth cross-timing are detected, and neither the second cross-timing nor the third cross-timing is detected.

5. The motor drive control device according to claim 1, wherein the control circuit sets the two or more reference voltage values independently of one another.

6. The motor drive control device according to claim 5, wherein the control circuit outputs the drive control signal based on rotation number command information on a rotation number of the motor, and sets the two or more reference voltage values based on the rotation number command information.

7. A motor drive control method for outputting a drive control signal for performing advance-angle control on a motor to drive the motor, and outputting a drive signal to the motor with a phase based on the drive control signal to drive the motor, the method comprising:

a current detecting step of detecting a voltage value corresponding to a drive current of the motor;

a cross-timing detecting step of detecting cross-timings between the voltage value detected in the current detecting step and each of two or more reference voltage values, wherein at least one of the two or more reference voltage values is larger than another one of the two or more reference voltage values; and an advance-angle control step of performing the advance-angle control based on time interval(s) between the detected cross-timings in the cross-timing detecting step to adjust a phase of the drive current, wherein the control circuit detects a first cross-timing between the voltage value and a first reference voltage value, and a second cross-timing between the voltage value and a second reference voltage value larger than the first reference voltage value when the voltage value increases, detects a third cross-timing between the voltage value and the second reference voltage value and a fourth cross-timing between the voltage value and the first reference voltage value when the voltage value decreases, compares a first interval from the first cross-timing to the second cross-timing with a second interval from the third cross-timing to the fourth cross-timing, and performs the advance-angle control based on a comparison result between the first interval and the second interval.

* * * * *